United States Patent [19]

Lauterbach

[11] 4,128,353

[45] Dec. 5, 1978

[54] ALLOCHIRALLY DIVIDED CONNECTOR FOR TUBULAR FRAME MEMBERS

[76] Inventor: Jacques V. Lauterbach, Saint Apollinaire, DiJon, France, 21000

[21] Appl. No.: 862,283

[22] Filed: Dec. 19, 1977

[30] Foreign Application Priority Data

Dec. 22, 1976 [FR] France .......................... 76 39210

[51] Int. Cl.$^2$ .............................................. F16D 1/00
[52] U.S. Cl. ........................... 403/175; 403/340; 403/344; 403/407
[58] Field of Search ............ 403/169, 170, 171, 175, 403/176, 311, 331, 340, 344, 406, 407

[56] References Cited

U.S. PATENT DOCUMENTS

| 2,863,682 | 12/1958 | Canepa | 403/175 |
| 3,545,796 | 12/1970 | Nicholis | 403/344 X |
| 3,554,584 | 1/1971 | Brumlik | 403/171 |
| 3,596,949 | 8/1971 | Turpen | 403/407 X |
| 3,834,549 | 9/1972 | Burg et al. | 403/175 UX |
| 3,881,830 | 5/1975 | Kato et al. | 403/171 |
| 3,912,410 | 10/1975 | Pofferi | 403/170 |
| 3,973,854 | 8/1976 | Gilbo et al. | 403/170 |

*Primary Examiner*—Wayne L. Shedd
*Attorney, Agent, or Firm*—Otto John Munz

[57] ABSTRACT

The invention relates to a member for assembling tubular elements designed to form a two-dimensional or three-dimensional structure. Such member comprises two half-shells which can be nested one on the other, thus defining a passage for a tube of the structure, and having stub tubes onto which the other tubes are to be fitted.

6 Claims, 15 Drawing Figures

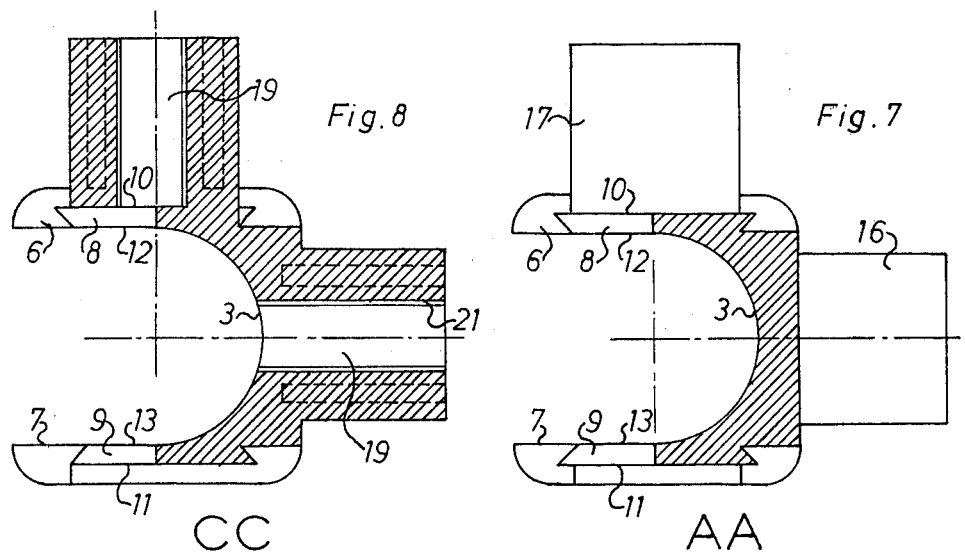
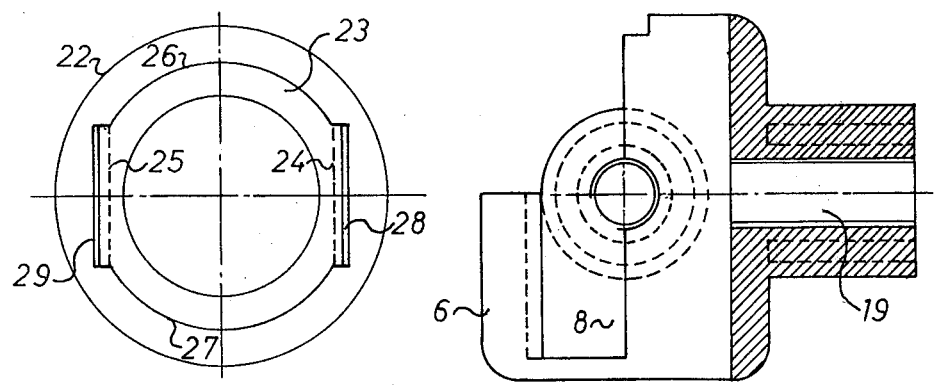
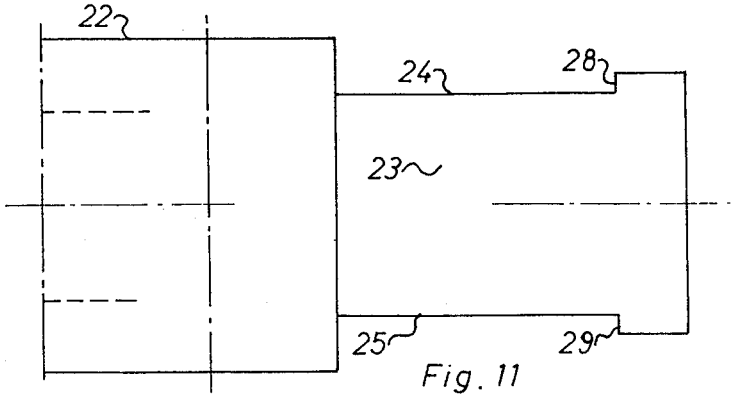

ALLOCHIRALLY DIVIDED CONNECTOR FOR TUBULAR FRAME MEMBERS

BACKGROUND OF THE INVENTION

1. Field of the Invention

A member for assembly of tubular elements for the construction of display units, shelving units, advertising stands and the like.

2. Description of the prior art

One known means of fitting several tubes to one another with the object of obtaining display units, advertising stands or supports of the same type consists in employing brackets which are fixed on a vertical tubular post by radial screws, on which are adapted to rest the horizontal tubular rails of the structure to be developed. The disadvantage of means of this type is to leave the screws visible and of not permitting more than two horizontal rails to be disposed at the same level.

Another known means consists in using a clip which is held by being keyed on a rail, and into which is threaded a second rail. The disadvantage of this type of apparatus is of the same nature as that previously mentioned, namely, it is not possible to arrange more than one rail in a plane perpendicular to the first.

SUMMARY OF THE INVENTION

The invention has for its object a member for assembling tubular elements so as to form a two-dimensional or three-dimensional structure, which has the following advantages:

depending on its different constructional forms, it permits from one to four other tubes to be connected to a first tube and in the same perpendicular plane as the latter, although it can be made in accordance with four different designs, it can be manufactured with a single mould, it is easy to use and has an aesthetic appearance, because it does not allow any fixing element of the screw, bolt or key to be visible.

An assembly member for tubular elements, designed to form a two-dimensional or three-dimensional structure, more particularly for the construction of display units, advertising stands, shelving units, etc., in accordance with the invention, is formed of two half-shells which can be nested on one another by a sliding movement.

According to one particular feature of the invention, each half-shell has an internal channel having the form of a semicylinder of revolution and two parallel flat cheeks or flanges, of which the internal spacing is equal to the internal diameter of the channel and of which the length is equal to half the length of the latter. The internal faces of the flanges are each connected to the channel by a groove or slot, of which the base is wider than the entry face, so that its cross-section is a trapezeum. Corresponding to the grooves as thus defined and for holding the two half-shells together are two ribs projecting on the external sides of the channel, and of the same shape as the grooves and being fitted into these latter when two half-shells are nested one in the other; the ribs, once they are in the grooves, form a dovetail assembly. When the two half-shells are nested in one another, they define a cylindrical passage for a first tubular element by their channels which face one another.

According to another feature of the invention, at least one half-shell has at least one external stub tube for the fixing of a tubular or other complementary element. These stub tubes are disposed, projecting towards the exterior, along two axes perpendicular to the axis of the cylinder of the channel. Depending on the constructional forms of the assembly member, one half-shell may either have only one stub tube, or it may have two thereof, or not have any. It is thus possible, by a suitable choice of the half-shells, to achieve an adaptation, on a first tubular element extended into the cylinder formed by the two channels, of either one, or two or three or even four other tubular elements, all in the same perpendicular plane relatively to the first.

The external stub tubes are preferably formed of two coaxial cylinders of revolution separated by an annular space, and the cylinder of smaller diameter is threaded internally for receiving a screw or bolt, as a result of which the assembly member is held by pressure on the first tubular element introduced into the cylinder formed by the two channels.

If the stub tubes of the assembly member are all of the same external diameter, they are normally intended to receive tubes of the same diameter. However, it is visualised that one or more tubes of different diameters may be mounted on the assembly member. In order to achieve this, provision is made for one stub tube to be provided with an extension axially of the said tube, said extension comprising two parallel flat faces connected by two cylindrical surfaces with two terminal stop members or abutments.

Fitted on to the extension by a latching action is a union which is provided at its end with a particular stub tube having a diameter different from the actual stub tube of the half-shell.

The fitting up of a three-dimensional structure by using the assembly member according to the invention is extremely simple. On a vertical tubular post, for example, is fitted a first half-shell by first of all engaging its flanges, and then the base of the channel by a displacement perpendicularly of the axis of the post. The second half-shell is then engaged at a different height and the two half-shells are caused to slide towards one another, axially of the post, until the ribs nest in the corresponding grooves.

The assembly member is thus made fast with the post, on which it may however slide. For fixing it at the required height, it is sufficient to introduce a screw or bolt into one of the stub tubes and to screw it into the screwthread provided for this purpose.

BRIEF DESCRIPTION OF THE DRAWINGS

The invention will be more readily understood by way of example from the following description, reference being made to the accompanying drawings, in which:

FIG. 7 is a section according to A A of FIG. 3.

FIG. 8 is a section according to C C of FIG. 3.

FIG. 9 is a section according to B B of FIG. 6.

FIG. 10 is a front view to a scale twice as large as the previous figures of a stub tube provided with an extension.

FIG. 11 is a top plan view of the same tube.

DESCRIPTION OF THE PREFERRED EMBODIMENT

Figure 1:
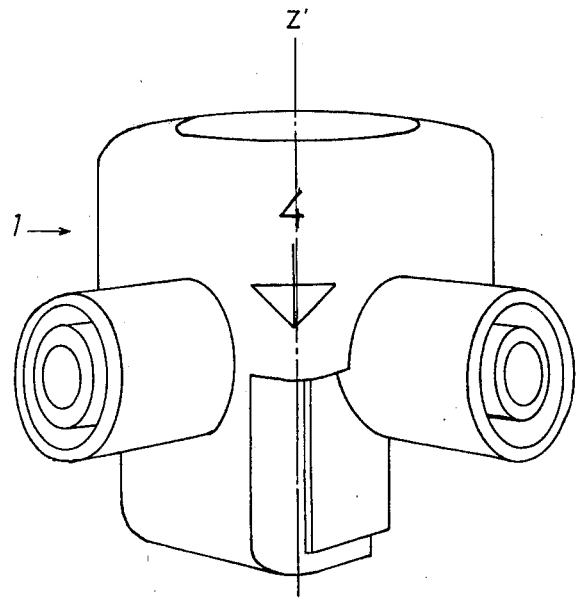
FIGS. 1 and 2 are perspective views of an assembly member according to the invention, split up to its two half shells.
Figure 2:
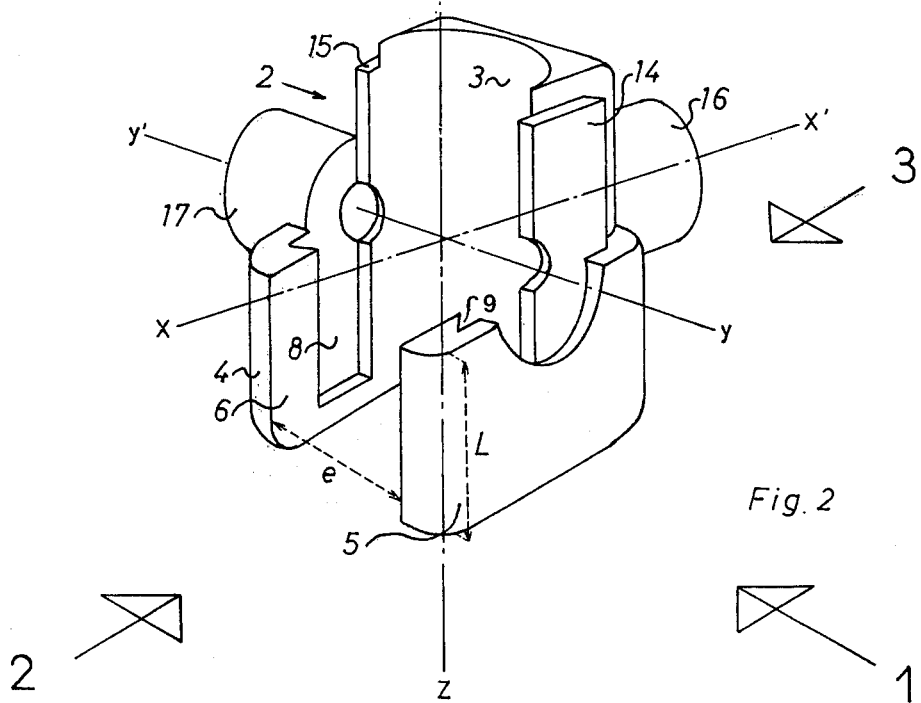
Figure 3:
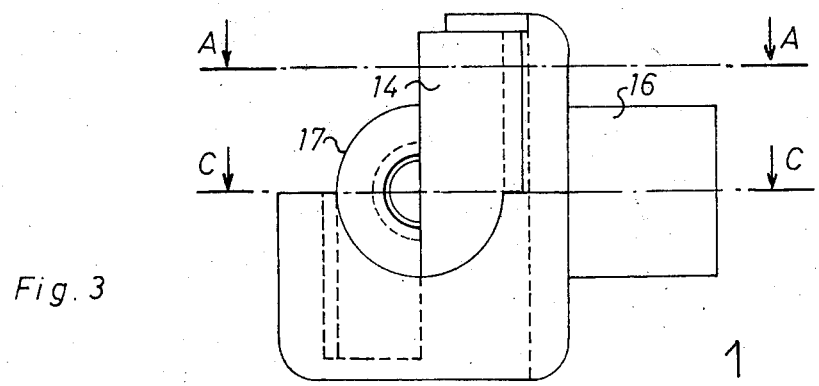
FIGS. 3, 4, 5 and 6 are views, respectively in the directions 1, 2, 3 and 4, of the half-shell shown in FIG. 2.
Figures 4, 5:
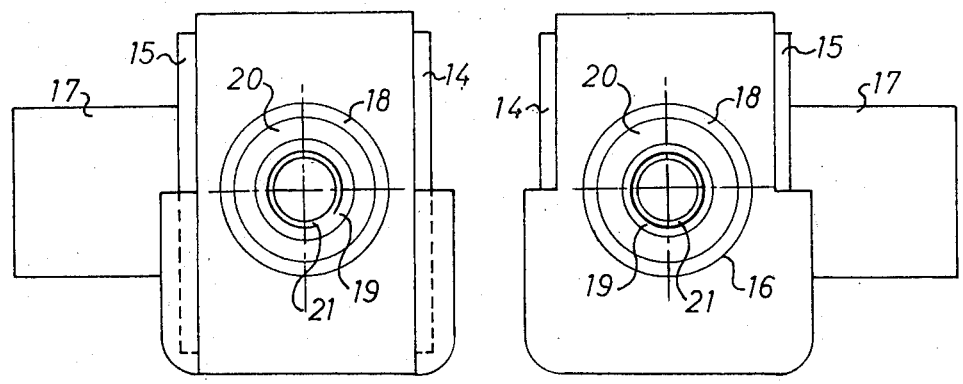
Figure 6:
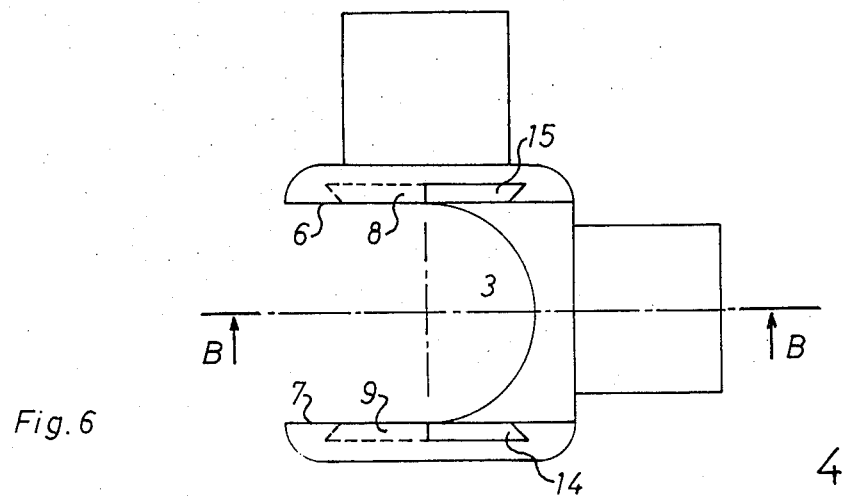
Figure 14:
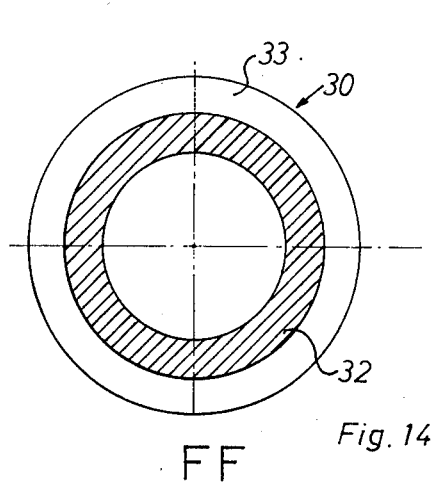
FIG. 14 is a section according to F F of FIG. 13.
Figure 12:
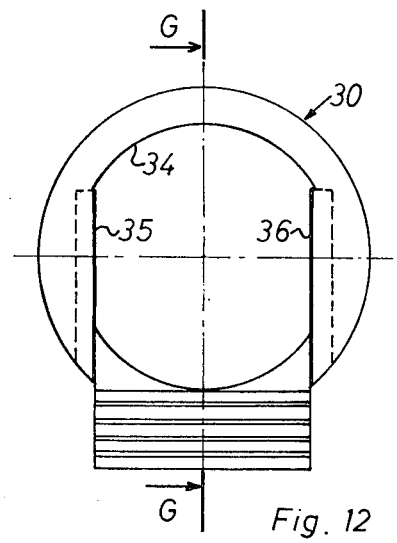
FIG. 12 is a front view of a union.
Figure 15:
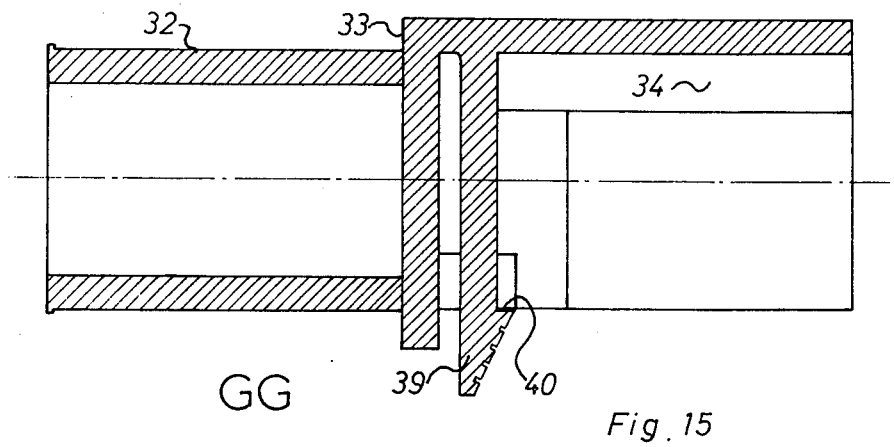
FIG. 15 is a section according to G G of FIG. 12.
Figure 13:
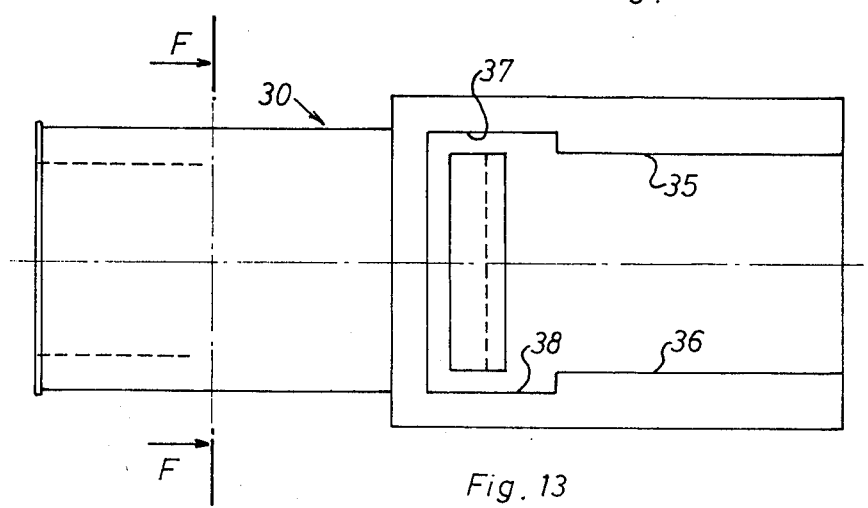
FIG. 13 is an underneath plan view of the same union.

An assembly member according to the invention comprises two half-shells 1 and 2 (FIGS. 1 and 2), which are nested one within the other by reciprocal displacement along their common axis ZZ′.

Since the same component elements are to be found on each half-shell, only those of the half-shell 2 will be described.

The latter comprises a channel 3 having the form of a semi-cylinder of revolution on the axis ZZ′, and two flat parallel flanges 4 and 5, the spacing "e" of which is equal to the diameter of the base circle of the channel 3, and of which the length L is equal to half the length of the channel.

The internal faces 6 and 7 of the flanges 4 and 5 are each connected to the channel 3 by a groove 8 and 9, respectively, of which the cross-section is a trapezeum, the bases 10 and 11 of the grooves being wider than the front faces 12 and 13, thus presenting a dovetailed form.

On the sides of the channel 3, two ribs 14 and 15 in relief and of the same shape as the grooves 8 and 9 are adapted to be inserted in the said grooves of the other half-shell. The nesting of the two half-shells on one another is thus maintained by a dovetail form of assembly. In the embodiment which is shown in FIGS. 1 to 9, each half-shell has two stub tubes 16 and 17, on which can be fitted a complementary element. It is thus seen that once the two half-shells 1 and 2, are nested in one another, and a tubular element is inserted into the cylinder formed by their channels, it will be possible to assemble on this tubular element, for example, four tubes in the same plane XX′, YY′, perpendicular to the axis ZZ′.

Each stub tube 16 and 17 is formed of two cylinders of revolution 18 and 19, separated by an annular space 20. The internal cylinder 19 is threaded at 21. In other embodiments of half-shells (1 and 2), which are not shown, the said half-shells may not be formed with a stub tube, or they may have only one or two, as in the case of the figures. It is therefore seen that, to a single tube on which an assembly member will be mounted and fixed by a screw or bolt screwed into the screwthread 21, it will be possible at will to fit one, two, three or four tubes, and in the chosen directions. It is therefore possible according to the invention for the half-shells 1 and 2 each to have a single stub tube in the direction XX′, for example, this arrangement permitting two opposed tubes to be fixed, or for the half-shell 1 to have a stub tube in the direction XX′ and the half-shell 2 a stub tube in the direction YY′, this permitting two tubes to be fixed at right-angles.

It is also noted that all the half-shells can be manufactured by using only a single mould, whether it is a question of injection moulding, in the case of a synthetic plastics material, or of pressure moulding, in the case of metal. It is in fact sufficient to have a mould equipped with three carriages, which are moved or omitted, depending on the number of stub tubes which are required.

FIGS. 10 and 11 show a stub tube which is identical on its first part 22 to the stub tube 17, but is provided with an extension 23. The extension 23 has two parallel flat faces 24 and 25, which are connected by two cylindrical faces 26 and 27; it ends in two stops or abutments 28 and 29.

Shown in FIGS. 12 to 15 is an union 30 which is adapted to be fitted to the extension 23. This union 30 has a first part which is formed of a cylinder of revolution 32, on which a tube (not shown) can be fitted and come into abutment against a shoulder 33. A second part comprises an internal channel, of which the base 34 is a portion of a cylinder or revolution with a diameter slightly larger than that of the cylinder of the faces 26 and 27 of the extension 23, the said channel having sides 35 and 36, the spacing of which is slightly larger than the distance of the two flat faces 24 and 25. Two notches 37 and 38 are formed in the sides 35 and 36. It is accordingly possible for the union 30 to be nested on the extension 23, by sliding the flat faces thereof one upon the other by a movement in a direction parallel to these two flat faces. The union 30 is also formed with a flexible tongue 39 with a beak-like portion 40 which, on completing the fitting of the union 30 on the extension 23, is adapted to latch onto the latter. As the diameter of the part 32 of the union 30 is different from that of the stub tube 22, it thus becomes possible, by adding this union, to provide the assembly member with one or more tubes of different diameters.

I claim:
1. In a member for assembling tubular elements two half-shells which can be nested one on the other and each having an internal channel in the form of a semi-cylinder of revolution, and two parallel flat flanges, the internal spacing of which is equal to the internal diameter of said channel, and of which the length is equal to half the length of the latter, said two half-shells having the same axis when they are nested on one another.

2. An assembly member according to claim 1, wherein the internal faces of said flanges are each connected to said channel by a groove parallel to the axis of the latter, the base of said groove being wider than the front face, whereby the cross-section of the said groove is a trapezeum, and wherein said channel has, parallel to its axis and on each side, a projecting external rib of a form identical with that of said grooves, each rib fitting into a groove when said two half-shells are nested one in the other, so as to provide a connection of dovetail form.

3. An assembly member according to claim 2, wherein at least one half-shell has at least one cylindrical external stub tube for fixing a complementary element.

4. An assembly member according to claim 3, wherein said cylindrical stub tube is formed of two coaxial cylinders separated by an annular space, the cylinder of smaller diameter being internally threaded.

5. An assembly member according to claim 4, wherein at least one cylindrical external stub tube is provided with an extension on the same axis and having externally two parallel flat longitudinal faces connected by two cylindrical surfaces and internally an axial bore, said two flat faces each having a projecting abutment at their end.

6. In a member for assembling tubular elements, two half-shells which can be nested one on the other and each having an internal channel in the form of a semi-cylinder of revolution, and two parallel flat flanges, the internal spacing of which is equal to the internal diameter of said channel and of which the length is equal to half the length of the latter, said two half-shells having same axis when nested one on the other, a groove parallel to the axis of said channel connecting each said flange to each said channel, the base of said groove being wider than the front face, whereby the cross-section of said groove is a trapezeum, a projecting external rib of a form identical with that of said groove on each side of said channel, at least one external cylindrical stub tube projecting from at least one half-shell, said cylindrical stub tube being formed of two coaxial cylinders separated by an annular space, the cylinder of smaller diameter being internally threaded, at least one extension on the same axis as one stub tube, said extension having externally two parallel flat longitudinal faces connected by two cylindrical surfaces and internally an axial bore, said two flat faces each having a projecting abutment at their end, and a union fitted on said extension, said union having an internal channel, of which the base is a portion of a cylinder of revolution and of which the sides are two parallel flat faces, said sides being each formed with a notch, a flexible tongue formed with a beak being movable in said notches, said union also having a part in the form of a cylinder of revolution with the same axis as the base cylinder of the channel.

* * * * *